United States Patent
Dasgupta et al.

(10) Patent No.: US 9,982,535 B2
(45) Date of Patent: May 29, 2018

(54) MONITORING OF RESERVOIR FLUID MOVING ALONG FLOW PATHWAYS IN A PRODUCING OIL FIELD USING PASSIVE SEISMIC EMISSIONS

(75) Inventors: Shivaji N. Dasgupta, Dhahran (SA); Saleh Al Ruwaili, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 1520 days.

(21) Appl. No.: 12/919,062

(22) PCT Filed: Mar. 2, 2009

(86) PCT No.: PCT/US2009/001379
§ 371 (c)(1),
(2), (4) Date: May 16, 2013

(87) PCT Pub. No.: WO2009/108394
PCT Pub. Date: Sep. 3, 2009

(65) Prior Publication Data
US 2013/0282291 A1 Oct. 24, 2013

Related U.S. Application Data

(60) Provisional application No. 61/032,794, filed on Feb. 29, 2008.

(51) Int. Cl.
*E21B 49/00* (2006.01)
*G01V 1/30* (2006.01)

(52) U.S. Cl.
CPC .............. *E21B 49/008* (2013.01); *G01V 1/30* (2013.01); *G01V 2210/123* (2013.01)

(58) Field of Classification Search
CPC ... E21B 49/008; G01V 1/30; G01V 2210/123
(Continued)

(56) References Cited

U.S. PATENT DOCUMENTS 5,377,104 A 12/1994 Sorrells et al.
5,796,678 A 8/1998 Pisetski
(Continued)

FOREIGN PATENT DOCUMENTS

WO 2007056278 A2 5/2007

OTHER PUBLICATIONS

International Preliminary Report on Patentability, dated May 11, 2010, PCT/US2009/01379 (7pages).
(Continued)

*Primary Examiner* — Fernando L Toledo
*Assistant Examiner* — Adam S Bowen
(74) *Attorney, Agent, or Firm* — Abelman, Frayne & Schwab

(57) ABSTRACT

A system of and method for determining whether a liquid moving in an oil-bearing reservoir rock formation is water or oil is provided. The oil-bearing rock formation includes at production well(s) and source(s) of injected water during normal oil production. A fluid pathway is identified, baseline number of passive microseismic events is established, passive microseismic events in the fluid pathway are monitored during oil production to sense microseismic events, the sensed microseismic events are compared to a baseline number of passive microseismic events. The fluid causing the microseismic events is determined to be water if the sensed number of microseismic events approaches the baseline number of passive microseismic events per the predetermined unit, and if the baseline number of passive microseismic is measured during a time period when the water injection is greater than the rate of water injection during normal oil production.

18 Claims, 12 Drawing Sheets

(58) Field of Classification Search
USPC .......................................................... 702/13
See application file for complete search history.

(56) References Cited

U.S. PATENT DOCUMENTS

| | | | |
|---|---|---|---|
| 6,028,020 | A | 2/2000 | Pisetski |
| 6,049,508 | A | 4/2000 | Deflaudre |
| 6,498,989 | B1 | 12/2002 | Pisetski et al. |
| 6,614,717 | B1 | 9/2003 | Khan et al. |
| 6,644,402 | B1 * | 11/2003 | Sharma .................. E21B 23/08 166/250.01 |
| 6,920,083 | B2 | 7/2005 | Therond et al. |
| 6,941,227 | B2 | 9/2005 | Goloshubin et al. |
| 7,127,353 | B2 | 10/2006 | Geiser |
| 7,242,637 | B2 | 7/2007 | Van Den Beukel et al. |
| 2006/0023567 | A1 * | 2/2006 | Uhl ........................ G01V 1/40 367/13 |
| 2007/0255545 | A1 * | 11/2007 | Pita ....................... G01V 11/00 703/10 |
| 2007/0286023 | A1 * | 12/2007 | Bull ....................... G01V 1/003 367/59 |
| 2008/0004847 | A1 | 1/2008 | Bradford |
| 2008/0151691 | A1 | 6/2008 | Eisner et al. |

OTHER PUBLICATIONS

Dyer B C et al., "Microseismic Survey of a North Sea Reservoir," World Oil, Gulf Publishing Company, Houston TX, US (1999), vol. 220, No. 3, pp. 74-78.

Feng Q et al., "Microseismicity, stress, and fracture in the Coso geothermal field, California", Tectonophysics, vol. 289, Issues 1-3, Apr. 15, 1998, pp. 221-238.

Maxwell Shawn C. et al., "The role of passive microseismic monitoring in the instrumented oil field", The Leading Edge; Jun. 2001; v. 20; No. 6; p. 636-639.

International Search Report and the Written Opinion of the International Searching Authority, or the Declaration dated Apr. 29, 2009 for PCT/US2009/01379 (9 pages).

Lee et al., "Principles and Applications of Microearthquake Networks," Advances in Geophysics, Supplement 2, Academic Press, New York, NY (1981), pp. 20, 70-71.

Davis et al., "Induced Seismic Deformation in the Cogdell Oil Field of West Texas," Bulletin of the Seismological Society of America, vol. 79, No. 5, Oct. 1989, pp. 1477-1495.

Willis et al., "Active and passive imaging of hydraulic fractures," Geophysics: The Leading Edge of Exploration, vol. 7, No. 11, Jul. 1992, pp. 15-22.

Marsden et al., Mathematical Foundations of Elasticity, Dover Publications, New York (1983), p. 194.

Taylor et al., "Dilatant Stabilization of Subduction Earthquake Rupture into the Shallow Thrust Interface," Fall AGU 1998, http://esag.harvard.edu/taylor/Dilatancy.html (retrieved Mar. 18, 2010), pp. 1-11.

Raymer et al., "Genetic algorithm design of microseismic injection-monitoring networks in the Tengiz field," SEG Int'l Exposition and 74th Annual Meeting, Denver Colorado, Oct. 10-15, 2004, pp. 1-4.

Dasgupta, Shiv N., "When 4D seismic is not applicable: Alternative monitoring scenarios for the Arab-D reservoir in the Ghawar Field," Geophysical Prospecting, vol. 53 (2005), pp. 215-227.

Shapiro et al., "Fluid induced seismicity guided by a continental fault: Injection experiment of 2004/2005 at the German Deep Drilling Site (KTB)," Geophysical Research Letters, vol. 33, L01309, 2006, pp. 1-4.

* cited by examiner

MONITORING OF RESERVOIR FLUID MOVING ALONG FLOW PATHWAYS IN A PRODUCING OIL FIELD USING PASSIVE SEISMIC EMISSIONS

RELATED APPLICATIONS

The present application is a United States national phase application under 35 USC § 371 of PCT/US09/01379 filed on Mar. 2, 2009, which claims priority to U.S. Provisional Patent Application 61/032,794 filed on Feb. 29, 2008, both of which are incorporated by reference in their entireties in the present application.

BACKGROUND OF THE INVENTION

Field of the Invention

The present invention relates to a method of monitoring reservoir rock containing hydrocarbons, and in particular to a method and system for the identification of the type of liquid moving along flow pathways of a producing field using passive seismic emissions.

Description of Related Art

Microseisms in reservoir rock matrixes in producing oil fields are generally the result of pore pressure perturbation and geomechanical stress field relaxation due to liquid movement as reservoir fluids are produced and/or injected. The microseisms, or micro-earthquakes, are generated because the stress field in the reservoir, and fluid flow, is anisotropic. The anisotropy is generally due to heterogeneity in reservoir rocks. Existence of joints, bedding planes, faults, and fractures are common in sedimentary rock. In most reservoirs, the in-situ stress conditions due to overburden pressure keep these features closed to fluid flow. During the production life of a hydrocarbon reservoir, changes in fluid pressures result in perturbation of the in-situ stresses. These effects are discussed in greater detail in Taylor et al., "Dilatant Stabilization of Subduction Earthquake Rupture into the Shallow Thrust Interface," http://esag.harvard.edu/taylor/Dilatancy.html.

The microseisms follow the same laws of physics for generation and transmission as do natural earthquakes. Microseisms result from elastic rock failure of the reservoir rock matrix. The micro-earthquakes are due to shear stress release along zones of weakness in the rock formation. The stress release is due to perturbation caused by reservoir production and injection operations. Water injection generates increased reservoir pore pressure which causes an increase in shear stress in reservoir rocks. This impacts the stability along the planes of weakness present in reservoir rocks, such as joints, bedding planes, faults and fractures. Similarly, reservoir oil production operations or fluid withdrawal create a pore pressure sink which also affects the stability along the zones of weakness. Seismic waves from microseismic events are transmitted from the source location (or hypocenters) to remote sensors (or seismometers). The hypocenters of microseismic events correspond with locations of elastic rock failure that form the fluid conduits.

Microseismic event generation from fluid injection was observed in experimental results conducted in the KTB (Kontinentales Tiefbohrprogramm der Bundesrepublik Deutschland) site. The results were published in "Fluid induced seismicity guided by a continental fault: Injection experiment of 2004/2005 at the German Deep Drilling Site (KTB)," by S. A. Shapiro et al., *Geophysical Research Letters*, vol. 33, L01309, 2006 (doi: 10.1029/2005GL024659). Flow anisotropy and non-linearity of its hydraulic behavior is observed. As described in the publication, microseisms are triggered by pressure perturbations from fluid injections. This is related to the energy transport process of pore pressure diffusion. Increasing fluid pressure during injection causes a decrease of the effective normal stress and leads to sliding along preexisting sub-critical cracks and fractures. The geometry of clouds of micro-earthquake hypocenters indicates that the pressure diffusion is a dominant mechanism of seismicity triggered by fluid injections. One approach for estimating the hydraulic diffusivity of rocks using microseismicity uses a spatio-temporal analysis of the cloud of fluid-injection induced events. The simplest version uses an equation describing the spatial position r of the so-called triggering front, i.e., the location of microseismic event induced in the reservoir, in an effective isotropic homogeneous poro-elastic medium with the scalar hydraulic diffusivity D at time t:

$$r = \sqrt{4\pi D t}$$

As the in situ stresses are perturbed by reservoir production and injection activities, the resulting changes in fluid pressure create elastic failure in the rocks and cause microseismic events. Microseisms emanating from the reservoir, with local magnitude levels down to a Richter value $<-1$ or even lower, are detected. Events below a Richter value of $-3$ are often classified as background noise. These microseisms are detected in multi-component seismic sensors with wide bandwidth, over distances of 1 kilometer and greater. Conventionally, fluid flow monitoring, including the assessment of changes in the reservoir characteristics over the production time, is achieved with measurements in selected wells using downhole instrumentation at selected production time intervals.

A method for locating microseismic sources is disclosed in U.S. Pat. Nos. 6,049,508 and 6,920,083. Recorded microseismic waves consist of records of compressional waves, known as P-waves and shear waves, known as S-waves. The first arrival times of recorded P-waves and S-waves, and the velocities of the rock layers, are used to compute source location or hypocenter microseisms where the rock failure occurred. For each microseismic event, it is first necessary to determine the fault plane and slip direction (source mechanism) before investigating for source parameters. Such source location technique is implemented by identifying and classifying the first arrival time breaks and measuring arrival times of P-waves and S-waves. The amplitudes of these P and S-waves are detected and the seismograms are recorded. Also, polarization analysis is performed with hodograms or terminus of a moving vector for particle motion of the waves recorded in the three component sensors which are oriented orthogonally in the sensor package. The polarization analysis consists in measuring the spatial distribution of a three component (right-normal basis) signal over a time window using the covariance matrix. Most of the time, the results used are the "azimuth" and the dip inclination of the distribution main direction which is defined by a vector. This analysis determines the direction of a wave's approach to the three component sensors or detectors that are planted precisely with a known orientation.

U.S. Pat. No. 7,127,353 describes a method for monitoring seismic energy emitted from the reservoir. Monitoring the changes in seismic energy emission in response to pressure changes in the active well and altering the values of the processing parameters permits measurement of components of the permeability tensor. Changing fluid pressure causes seismicity to rapidly migrate outward from the points of fluid pressure change and will alter the characteristics of the seismic energy emission.

U.S. Pat. No. 5,377,104 describes an arrangement of seismic sensors to detect passive microseismic events induced in reservoir by hydraulic fracturing. The disclosure provides a system and method of monitoring and verification of the geologic containment of hydraulically induced fractures used for the disposal of hazardous wastes, to avoid cross contamination with water source.

Lee, et al., *Advances in Geophysics, Supp. 2, Principles and Applications of Microearthquake Networks*, (Academic Press, 1981); and Raymer et al., "Genetic Algorithm Design of Microseismic Injection-Monitoring Networks in the Tengiz Field", *SEG Technical Program Expanded Abstracts*, 2000, pp. 562-565; describe that the travel-time for induced microseismic events from source to receiver involves solving a set of first-order differential equations. A network of sensors distributed spatially on the surface and at different levels in a borehole records a number of arrival times n, for P-waves and S-waves from a microseismic event with hypocenter parameters (x,y,z,t). In matrix notation:

$$AX=B$$

where A is the n×4 design matrix of partial differentials, X is a vector of 4 unknown hypocenter parameters (x,y,z,t) and B represents vector differences between the calculated and observed travel times arrival. The design matrix determines the efficiency of the network. For a given matrix A and a set of observations of B, the equation will solve for unknown vector X. The partial differentials define how much the hypocenter parameters will change with respect to travel times. The uncertainty will be large when small changes in travel time cause large changes in hypocenter. This provides a quantitative measure for network performance in locating a microseismic event source. Performance of the network is evaluated by populating the reservoir volume of interest with trial location. On this volume, 3D seismic ray trace modeling is performed between the trial locations and the designated sensor positions to produce a complete set of partial differentials. Each partial differential would form a line of the design matrix. The optimal combination of sensor locations in the network is found by solving these equations.

An improvement to these approaches is disclosed in commonly assigned PCT Publication Number WO 2007/0562278 entitled "Continuous Reservoir Monitoring for Fluid Pathways Using 3D Microseismic Data." This application embodies a technique of mapping fluid conduits in hydrocarbon reservoirs. This system exploits the minute vibrations, or micro-earthquakes that are generated in the reservoir layers induced by fluid movement. These micro-earthquakes are recorded on sensitive seismic geophones that are deployed on the ground surface and in boreholes in the test area. These microseisms are detected as the fluids move in the reservoir. Referring to FIG. 3, a permanent network 70, including cemented geophones 72 that are deployed spatially on the ground surface and geophones 74 that are installed in a borehole monitor well 80, is used to record microseisms 76. The system continuously detects and records the passive micro-earthquakes or microseismic events emanating from the reservoir as fluids are produced and injected at a location 78 from an injection well 82.

Location computation of microseismic sources is a known art, and computer software is available for such analysis. The location in (x,y,z) coordinates for each microseismic event that is detected by the surface and borehole sensors is derived and its time of occurrence $T_o$ is obtained from Global Positioning System (GPS) time stamps from the recording system. The plurality of sensors in a high density network provides the redundancy in the recorded data and improves the accuracy in the source location of the detected events.

Monitoring of fluid pathways and delineating the reservoir fluid flow anisotropy is helpful in optimizing reservoir management plans and improving overall oil recovery. While the above described references disclose various methods and systems for deterring the location of one or more hypocenters, none disclose the delineation of the type of fluid passing through cracks and/or fractions.

U.S. Pat. No. 7,242,637 assigned to Shell Oil Company describes a time-lapse seismic survey process for investigating a subsurface reservoir region. The disclosure identifies water contact lines in the seismic representations, and also discusses a model that includes a sea water layer. However, these models do not detect passive microseismic emissions based upon movement of fluids.

U.S. Pat. No. 6,614,717 assigned to Nonlinear Seismic Imaging, Inc. also describes a time-lapse seismic imaging method. This reference discloses the viscosity difference between oil and water, and notes that hysteresis at seismic frequencies is related to the viscosity of the pore fluids. However, this reference relates to seismic imaging in a system including an active seismic source and receiver. There is no disclosure in the reference related to measurement or monitoring of passive microseismic emissions.

U.S. Pat. No. 6,498,989 and related U.S. Pat. Nos. 6,028,820 and 5,796,678, all assigned to Trans Seismic International Inc., describe a wave equation based on a discrete dynamic model that uses stress conditions as target parameters, which are used to discover oil and gas pools, as well as water reserves. The product data set from the equation can be outputted in the form of an initial isochron map, a pressure gradient map, a corrected isochron map, or an overlay of the relative pressure changeability map and the corrected isochron map, which are the basis for identifying the most probable locations of oil, gas, and water. The processes proposed in these references are for locating fluid accumulations from seismic imaging of subsurface regions, and presupposes a seismic reflection survey. Direction of fluid flow is inferred indirectly from the reflection surveys. There is no disclosure of monitoring of passive microseismic activity.

Patent Publication US2008/0151691 assigned to Schlumberger Technology Corporation discloses methods of passively monitoring microseismic events, which can be applied to hydrocarbon reservoirs and subterranean water-bearing layers. However, this disclosure relates to monitoring of hydraulic fracturing or reservoir stimulation using passive microseismic recordings, and does not in any way attempt to discern the type of liquid moving along a certain pathway in a reservoir.

U.S. Pat. No. 6,941,227 assigned to the Regents of the University of California describes frequency-dependent method for processing seismic data. One aspect of the disclosure relates to identifying an oil-water contact. However, this disclosure relies upon reflection surveys, and the frequency spectrum is analyzed from the acquired reflection data from a fluid filled reservoir and correlated with known accumulations. There is no discussion in the reference related to recording or processing of passive seismic emission data based upon fluid dynamics in a hydrocarbon reservoir.

None of the above references discloses the detection and monitoring of passive microseismic emissions to ascertain the type of fluid moving along a particular region of an oil reservoir. Accordingly, a need exists for a system for, and method of determining the location of a fluid front, and the type of fluid, moving through anisotropic flow pathways in oil reservoirs.

Therefore, it is an object of the present invention to determine the type of fluid moving through flow pathways in oil reservoirs based on the collection and analysis of passive microseismic data.

It is another object of the present invention to determine the location of the particular type of fluid moving through fluid pathways in oil reservoirs.

As used herein, the term fluid means a liquid that is predominantly oil or predominantly water, either of which may contain minor amounts of the other and dissolved gas. For the purposes of describing the method and system of the invention it is assumed that no significant volumes of hydrocarbon gas is present and or moving the volume of the reservoir rock that is being analyzed for characterization of the microseismic events.

SUMMARY OF THE INVENTION

The above objects and further advantages are provided by the system and process for determining whether a liquid moving in an oil-bearing reservoir rock formation is water or oil is provided. The oil-bearing rock formation includes at least one production well and at least one source of injected water during normal oil production. A preferential fluid pathway is identified. A baseline number of passive microseismic events per a predetermined unit of baseline time is established. Passive microseismic events in the preferential fluid pathway are monitored during normal oil production to sense a number of microseismic events during a predetermined unit period of monitoring time. The sensed number of microseismic events during the predetermined unit period of monitoring time are compared to the baseline number of passive microseismic events per the predetermined unit of baseline time. The fluid causing the microseismic events is determined to be water if the sensed number of microseismic events during the predetermined unit period of monitoring time approaches the baseline number of passive microseismic events per the predetermined unit, and if the baseline number of passive microseismic events per the predetermined unit baseline time is measured during a time period when the water injection is greater than the rate of water injection during normal oil production.

In an additional embodiment of the system and method of the present invention, the fluid causing the microseismic events is determined to be oil if the sensed number of microseismic events during the predetermined unit period of monitoring time approaches the baseline number of passive microseismic events per the predetermined unit, and if the baseline time is measured during a time period when the water injection is less than the rate of water injection during normal oil production.

In certain embodiments, the baseline is a quiet period, either following a ramped up water injection period, or following water injection at rates associated with normal oil production in reservoirs in periods of secondary recovery. The quiet period can be used to establish a baseline which is important for controlling the monitoring operations and interpreting the seismic data during the monitoring period.

The present invention relates to an improved method of, and system for reservoir monitoring, including identification of the fluid phase (oil or water) moving along flow pathways of hydrocarbon drainage and water movement in a reservoir. These flow pathways are generally along fracture swarms or other zones of weakness in reservoir rock. Microseismic events are detected along these zones of mechanical weakness as the fluids move in the reservoir rocks. Fluids are injected into, or extracted from, a producing reservoir with anomalous flow anisotropy. Water or brine is injected in the pore volumetric space of reservoir rocks to enhance oil production from the reservoir.

The method of this invention is useful for flood-front mapping in a black oil reservoir system consisting predominantly of oil and water (brine). It is assumed that no free gas is present in the system. Reservoirs containing oil and water, with a low gas-to-oil ratio (GOR), are abundant in giant carbonate fields. These carbonate rocks are extremely heterogeneous and many drilled wells have encountered anomalous fluid flow conduits, or pathways, along narrow fracture swarms. These features contribute to a flow anisotropy that cannot be determined from borehole data alone. Usually, the well spacing in such giant oil fields is sparse. Flood-front monitoring away from and between wells is imperative for optimum reservoir management and for increasing overall recovery. In a producing reservoir, mapping hydrocarbon fluid pathways and identifying respective liquid phase (oil or water) moving along such flow pathways, is crucial for improving and increasing oil recovery.

Upon application of the system and method described in commonly assigned PCT Publication WO 2007/0562278 to monitor reservoir fluid movement and determine the locations of microseismic events, it was unexpectedly determined and differention that identification of the type of liquid moving along a pathway can be made in accordance with the system and method of the present invention. This identification provides information useful to reservoir engineers in planning and deploying production and/or injection operations.

BRIEF DESCRIPTION OF THE DRAWINGS

The invention will be described in further detail below and with reference to the attached drawings in which the same or similar elements are referred to by the same number, and where.

DETAILED DESCRIPTION OF THE INVENTION

Figure 1A:
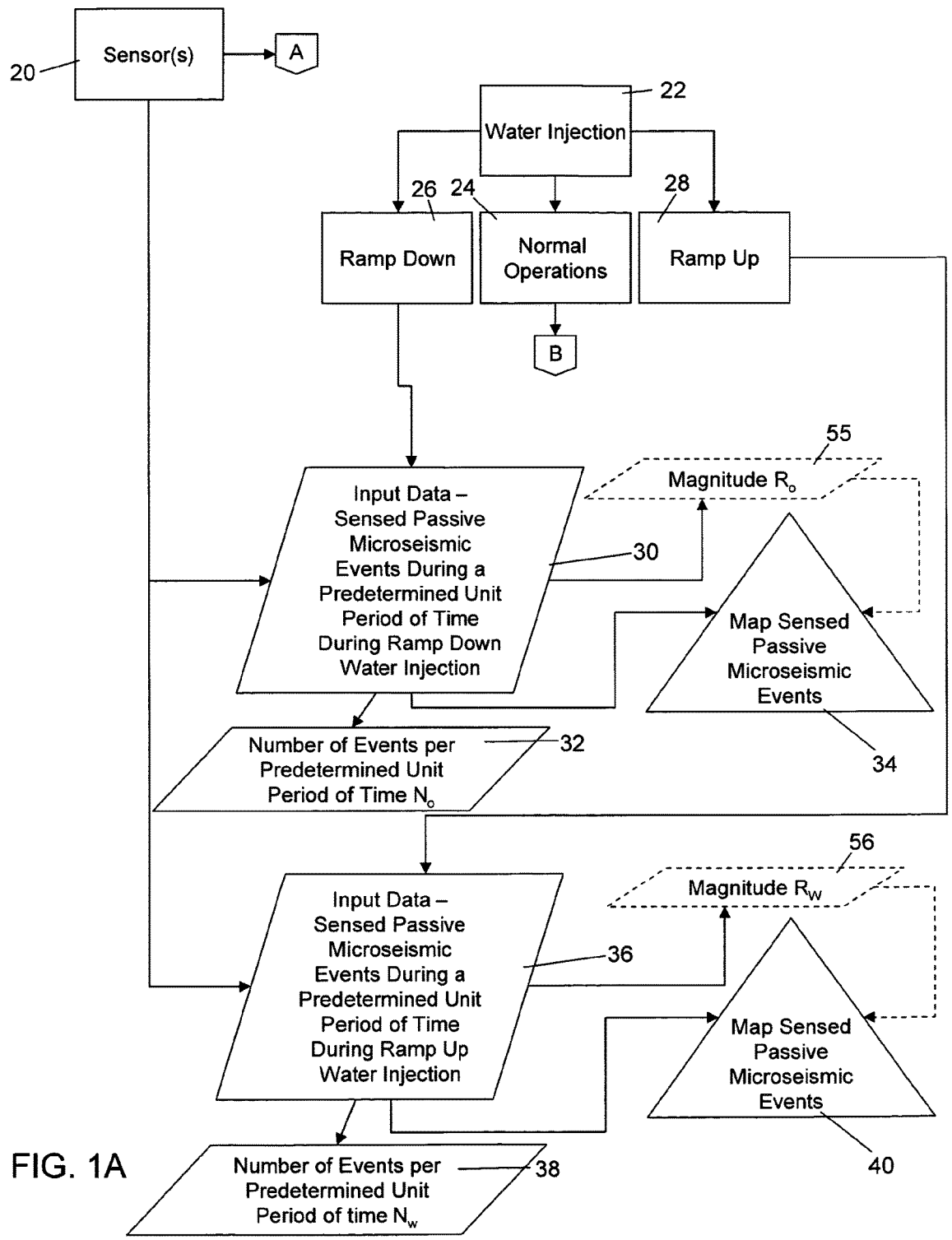
FIGS. 1A and 1B are schematic process flow diagrams for microseismic data analysis to determine the type of fluid moving along a flow pathway.

This invention is particularly useful in a producing reservoir to continuously define the map of preferential fluid movement directions (pathways) and also to identify the type of fluid moving along these preferential pathways. The flow pathways and the fluid phase moving along these pathways between wells cannot be measured easily using conventional measurements in drilled wells. The method and system of the present invention provides the orientation and distribution of preferential fluid pathways and identifies the fluid phase, differentiating between oil or water moving along the pathways. The mapping of fluid pathways and the identification of the type of fluid is useful to optimize fluid injection and production operations and improving overall oil recovery. During monitoring, the detected passive seismic emissions, in certain embodiments recorded and analyzed in real time, can define fluid flow pathways between the wells in a producing field. The water flood-front movement is often more complex, non-uniform and unpredictable. Fluid flow simulation provides stochastic models for the flood-front using data only at well control points. When oil is produced by water injection, the hydraulic parameters inferred from fluid-induced microseismic data can be used as fluid monitoring information. This data is used for optimizing reservoir management and exploitation.

The mobility of water through these reservoir conduits in an oil reservoir is much higher than oil. This is primarily because oil has higher viscosity than water. In an oil-bearing reservoir rock formation, the mobility ratio can be obtained with proper special core analysis, commonly known to those skilled in the art as "SCAL". For instance, oil originating from the Jurassic carbonate formations has a viscosity that is about three (3) times higher than that of water. In a reservoir that is at an intermediate stage of water flood recovery, the relative permeability of water and oil are approximately equal. This means that the mobility of water is about three (3) times that of oil in this reservoir. Therefore, the water is expected to travel faster than oil, especially in high permeability pathways such as fracture swarms.

The fluid flow potential through porous rocks in oil reservoirs is measured by permeability. The characteristics of flow through porous media is generally defined by Darcy's equation:

$$Q_{ph} = \frac{K \cdot k_{r,ph} \cdot A}{\mu_{ph}} \left\{ \frac{\Delta P}{\Delta X_i} \right\}$$

where $Q_{ph}$ is the rate (volume/time) at which phase ph, e.g. oil, or water, having viscosity $\mu_{ph}$ and relative permeability $k_{r,ph}$ flows across an area A within a reservoir having rock absolute-permeability K, when pressure drop $\Delta P$ is exerted on the phase ph over a distance $\Delta X_i$ perpendicular to the area A. Darcy's equation equates the flow rate $Q_{ph}$ to the pressure gradient $\Delta P/\Delta X$, multiplied by the transmissibility $(K \cdot k_{r,ph}) A/\mu_{ph}$. The factor $(K \cdot k_{r,ph})$ is the effective permeability of the reservoir rock relative to the phase ph. The factor $(K \cdot k_{r,ph})/\mu_{ph}$ is the mobility of the phase ph (oil or water) in the reservoir rock. The factor $K \cdot k_{r,ph}$ is the effective-permeability of phase ph in the reservoir rock, and may be abbreviated as $k_{ph}$.

Fluids with lower viscosities have greater mobility through the higher permeability areas in heterogeneous rocks. Trace patterns of microseismic events along these high permeability areas, such as through connected joints system or along fracture swarms, are more rapid. In general, the mobility of water, or hydraulic conductivity, $M_w$ in unit length per unit time can be expressed as:

$$M_w = (K \cdot k_{r,w})/\mu_w$$

where K is the absolute permeability of water in units of area, $k_{r,w}$ is the relative permeability of water (unitless), and $\mu_w$ is the viscosity of water in units of (force)(time)/(area) or in (pressure) (time). Similarly, the mobility of oil is expressed as $$M_o = K \cdot k_{r,o}/\mu_o$$

where K is the absolute permeability of oil, $k_{ro}$ is the relative permeability of oil and $\mu_o$ is the viscosity of oil.

In a preferential flow pathway having high absolute permeability K, $M_w$ is greater than $M_o$. In other words, water moves much faster than oil in a high-permeability conduit, leading in many cases to premature water breakthrough in certain production wells. Fast water movement in preferential reservoir pathways, e.g. fracture swarms, conduits, and channels, will be associated with shear elastic failures, i.e., microseismic events, that are detectable in a specific time period $\Delta t$ of interest to monitor the reservoir.

When an oil reservoir is at a primary recovery stage, that is, oil is flowing naturally under reservoir pressure drive, there is no water injection and the oil has higher saturation and relative permeability than water. In contrast, when the oil reservoir is at secondary recovery stage, i.e., oil is pushed by injected water to induce flow and production, there is water injection in the reservoir to move the oil towards oil producers, i.e., wells, thereby water and oil have relatively equal saturations and relative permeabilities. When, the reservoir is at tertiary recovery stage, where injected water cannot push or drive the remaining oil to the producers, water injection continues from injectors to producers with minimal, or null, oil production at the producing wells, thereby water has higher relative permeability than oil.

Additionally, microseisms associated with water movement, $M_w$, will have higher magnitude than those associated with oil, $M_o$, moving in such reservoir pathways. This attribute can also be employed in an alternative embodiment described in greater detail below.

Therefore, the frequency of microseismic events, $(N_{microseisms})w/\Delta t$, associated with injection water movement in a reservoir pathway, can be characterized. Similarly, it is possible to characterize the frequency of microseismic events, $(N_{microseisms})o/\Delta t$, associated with oil movement in a reservoir pathway.

Accordingly, if $N_w \equiv (Nmicroseisms)_w/\Delta t$ and $N_o \equiv (Nmicroseisms)o/\Delta t$, than:

$$N_w > N_o$$

in reservoirs having higher water mobility than oil mobility.

Thus, microseismic events associated with water movement along a reservoir pathway will be at a higher frequency, i.e., number of microseisms per time-period, as compared to microseisms associated with oil movements in the same reservoir pathway.

These criteria are applied in diagnosing the fluid phase flowing along a reservoir pathway by using the frequency and relative magnitude of microseisms detected along the same reservoir pathway.

Figure 1B:
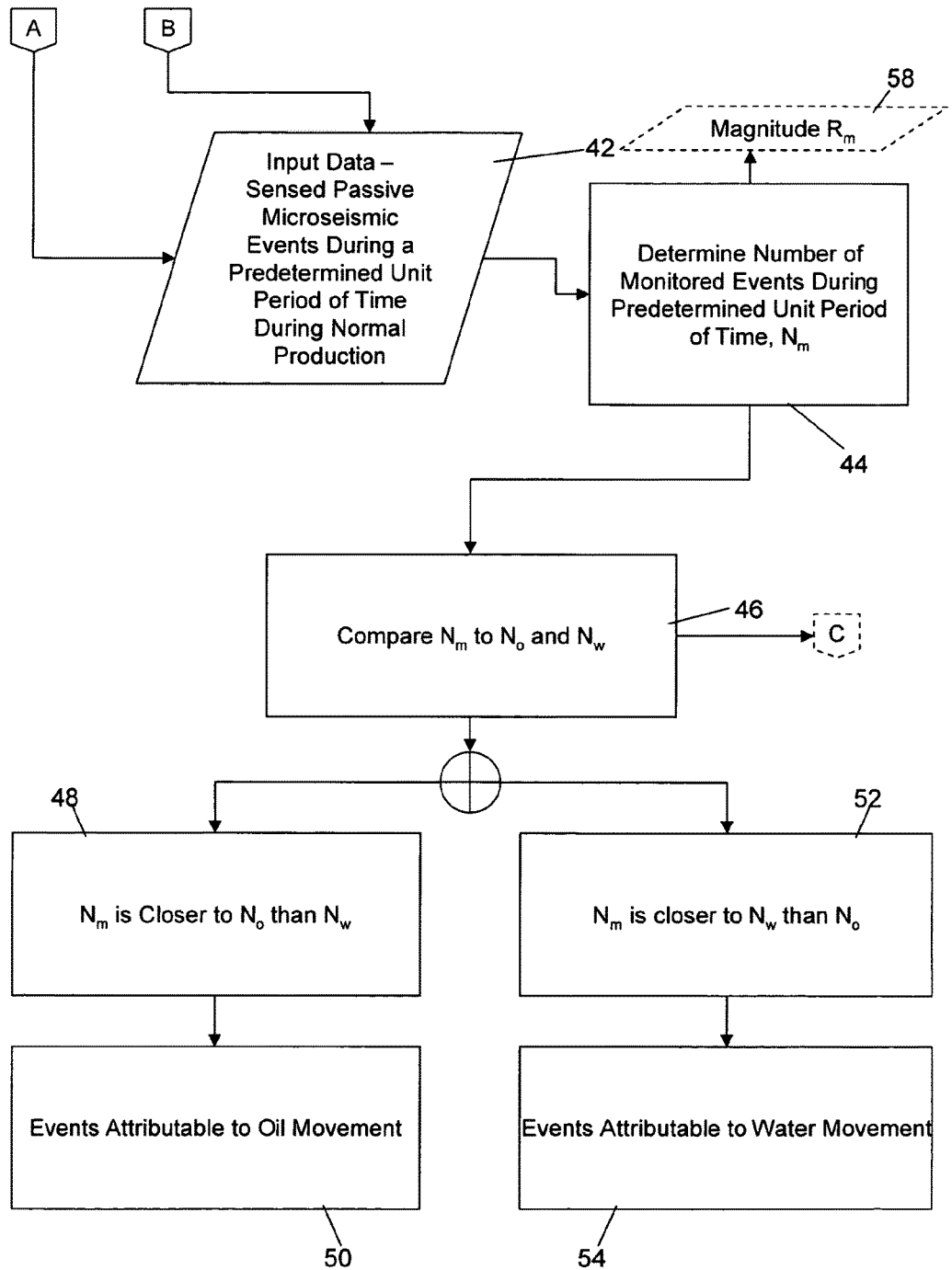

FIGS. 1A and 1B schematically illustrate a process flow of a method of identifying whether a liquid moving in a reservoir rock is water and/or oil. During steady-state activities in an oil-bearing reservoir rock formation, passive microseismic events are generally not attributable to movement of water or oil through anisotropic fluid pathways in the reservoir rock. In order to set a baseline for comparative purposes to effectively monitor a fluid pathway in a reservoir rock region, steps 30 through 40 are carried out to determine and map the number of passive microseismic events attributable to water flow during a rate of water injection that is less than a water injection rate during steady-state oil production, and to determine and map the number of passive microseismic events attributable to water flow during a rate of water injection that is greater than a water injection rate during normal periods of oil production. The microseismic event data transmitted from the sensors are received and recorded in a seismic server for processing and for storage, for example, in a data or disk storage device, or alternatively stored locally at each sensor and transmitted at a predetermined time to a seismic server for processing.

In particular, at step 30, when water injection 22 is reduced, or ramped down 26, data is inputted 30 related to sensed passive microseismic events in the oil-bearing reservoir rock region from sensors 20. The ratio $N_o$ of the number of microseismic events during a predetermined unit period of time is identified 32, and these events are mapped 34 to illustrate a preferential flow pathway. When water injection 22 is increased, ramped up 28, data is inputted 36 related to sensed passive microseismic events in the oil-bearing reservoir rock region from sensors 20. The ratio $N_w$ of the number of microseismic events during a predetermined unit period of time is identified 38, and these events are mapped 40. One or both of these ratios $N_w$ and $N_o$ can be used as baseline values for comparison to the number of events per predetermined unit of time during continuous monitoring as further described below.

During water injection 22, while normal oil production operation 24 is in progress, data is inputted 42 from sensors 20 related to the sensed microseismic events. The ratio $N_m$ of the number of microseismic events during a predetermined unit period of time is identified 44. The predetermined unit period of time can be on the order of one or more hours or one or more days, and may be the same or different for the ratios $N_m$, $N_w$ and $N_o$. The ratio $N_m$ is compared 46 to the ratios $N_w$ and $N_o$. During steady-state production and injection, no microseismic events attributable to the flow of oil or water in the fluid pathway should occur. However, during an anomalous event, for instance, while the injection rates are associated with normal production activities, and the system is no longer in steady-state, microseismic events will occur. If it is determined 48 that the ratio $N_m$ is closer to the ratio $N_o$ than to the ratio $N_w$, the microseismic events can be identified 50 as being attributable to oil movement along the preferential flow pathway. Conversely, if it is determined 52 that the ratio $N_m$ is closer to the ratio $N_w$ than to the ratio $N_o$, the microseismic events can be identified 54 as being attributable to water movement along the preferential flow pathway.

Figure 2:
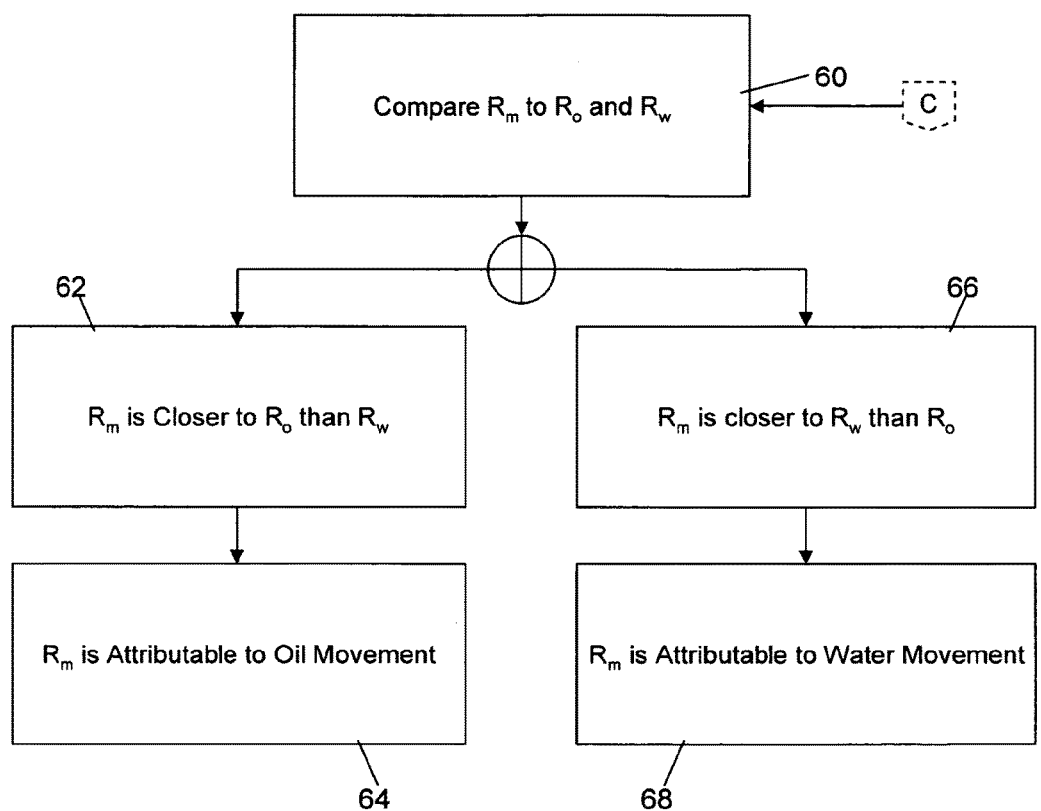
FIG. 2 is a schematic illustration of another embodiment of a process flow for microseismic data analysis to determine the type of fluid moving along a flow pathway.

In an alternative embodiment, and referring to steps 55, 56 and 58 and the connector block C shown in dashed lines in FIGS. 1A and 1B, and also referring to FIG. 2, the relative magnitudes of the sensed microseismic events can be used to provide further confidence in the determinations of the identities of the fluid moving along the flow pathway. In particular, during ramped down 26 water injection 22, the magnitude level $R_o$ is determined 55 and mapped 34. During ramped up 28 water injection 22, the magnitude level $R_w$ is determined 56 and mapped 40. During water injection 22 while normal oil production operation 24 is in progress, the magnitude level $R_m$ is determined 58.

The magnitude level $R_m$ is compared 60 to the magnitude levels $R_w$ and $R_o$. If it is determined 62 that the magnitude level $R_m$ is closer to the magnitude level $R_o$ than to the magnitude level $R_w$, the microseismic events can be identified 64 as being attributable to oil movement along the preferential flow pathway. Conversely, if it is determined 66 that the magnitude level $R_m$ is closer to the magnitude level $R_w$ than to the magnitude level $R_o$, the microseismic events can be identified 68 as being attributable to water movement along the preferential flow pathway. Note that these determinations 62, 66 are be used to supplement the determinations 48, 52 made in the process flow as shown in FIGS. 1A and 1B.

The location of the microseismic events is preferably determined with a plurality of microseismic sensors located on the surface, within a borehole, or both on the surface and in a borehole. For instance, the system and method described in commonly assigned PCT Publication WO 2007/0562278 can be advantageously employed to monitor reservoir fluid movement and determine the locations of microseismic events. In additional embodiments, methods for locating microseismic sources as disclosed in U.S. Pat. Nos. 6,049,508, 6,920,083, 7,127,353, and in the publications by Lee et al. and Raymer et al. can be used to determine the sources, provided that the methods include the determination of magnitudes and frequencies of microseismic events.

Figure 3:
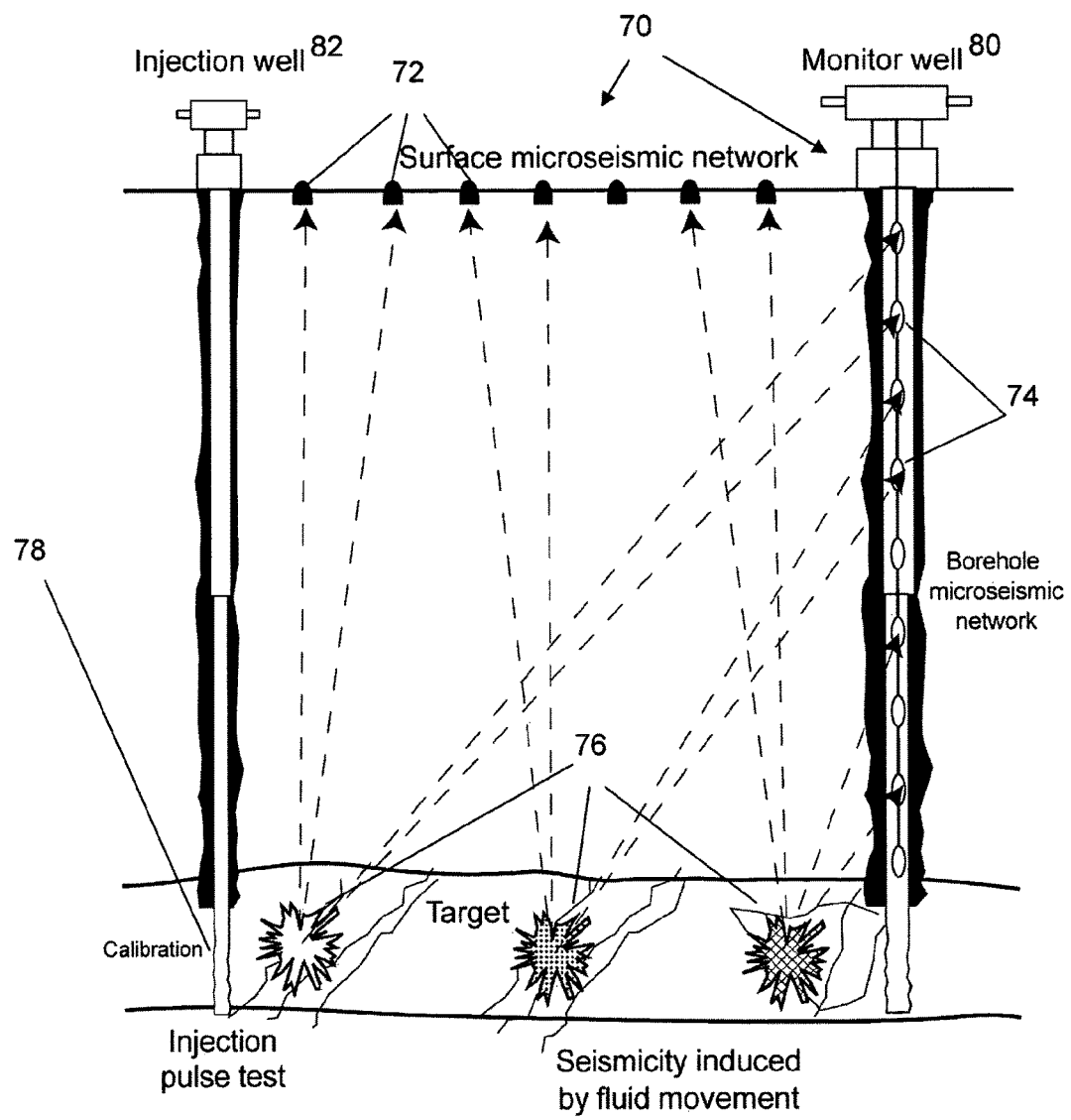
FIG. 3 is a schematic illustration of the network of sensors employed in an embodiment of the present invention.

In one preferred embodiment, the system of, and method for sensing microseismic events and mapping fluid conduits in hydrocarbon reservoirs, described in commonly assigned PCT Publication WO 2007/0562278, is used. As shown in FIG. 3, a network 70 included a grid of equally spaced seismic sensors 72 permanently cemented and deployed spatially on the ground surface and additional sensors 74 cemented in one or more borehole or monitor wells 80, as described in commonly assigned PCT Publication WO 2007/0562278, which is hereby incorporated by reference. In such a system, passive micro-earthquakes, or microseismic events 76, are continuously detected and recorded from the reservoir as fluids are produced and injected downhole at location 78, e.g., via an injection well 82. These microseismic tremors 76 are from the result of stress changes induced by the injection pulses 88 in the reservoir and/or from oil production activities.

The system exploits the minute vibrations, or micro-earthquakes 76 that are generated in the reservoir layers due to shear slippage in rocks induced by fluid movement. These micro-earthquakes are recorded on the seismic sensors 72, 74, or geophones, that are deployed at the earth's surface and in boreholes in the test area. These microseisms 76 are detected as the fluids move in the reservoir. The system continuously detects and records the passive microseismic events 76 emanated from the reservoir as fluids are produced and injected 78. Accordingly, three-dimensional continuously and real-time reservoir monitoring is provided as the fluids are produced from and injected into the reservoir. The distributed network of permanent surface sensors 72 and permanent multi-level sensors 74 in a borehole are used to acquire synchronized GPS time-stamped microseismic data. Universal time or GMT is obtained from GPS satellite receivers that are connected to the recorder. The data is collected at each sensor and recorded in a central recording system. Each sensor in the network is surveyed for its location, e.g., in the Cartesian coordinate system as x,y,z values, and in a spherical coordinate system as r, θ, φ for radial distance, zenith, and azimuth, respectively. The sensors are precisely orientated in the same configuration before cementing in place. The orientation of the borehole sensors is determined after the installation is complete by generating a controlled seismic source at measured azimuth directions around the well. The detected first arrival from the known seismic azimuth source at each sensor is analyzed in order to precisely determine its orientation.

From the 3-component borehole sensors, estimates of microseismic source or hypocenter location are made by selecting the first arrival times of P-waves and S-waves events (or first breaks) from the recorded seismograms. Hodogram analysis, as shown in FIG. 4D, provides the polarization direction of the waves, and the velocity of the reservoir rock obtained from other measurements in the area are used for tomographic inversion of the picked travel times to obtain the range for the source point of the microseismic event, or the hypocenter.

The high-density microseismic network employs triaxial or 3-component geophones capable of measuring artifact-free response over a frequency range of 10-500 Hz. The sensor elements are oriented mutually orthogonal to each other to ensure the detection of microseismic waves with particle motion in all orientations. The sensors detect microseismic source events that radiate from the rock-failure surface and emanate from within the reservoir.

Microseismic analysis techniques, which are well known to those of ordinary skill in the art, are adapted to integrate the high-density measurements at the surface with those made in the borehole for the purpose of determining the microseismic events radiated from the source location. For each microseismic event, it is first necessary to determine the slip direction or source mechanism before analyzing for source parameters.

The network of sensors can be calibrated by stimulating the reservoir in order to induce microseismic events. In certain methods, calibration is achieved by performing an injector pulse test, in which water injected in nearby injection wells is pulsed at predefined intervals. Explosive charges can be detonated in a nearby well at predefined depth levels in the reservoir. The resulting shock waves are detected at the surface and borehole sensors as seismic events with a delay time corresponding to the distance of the sensor from the source location.

Figure 10A:
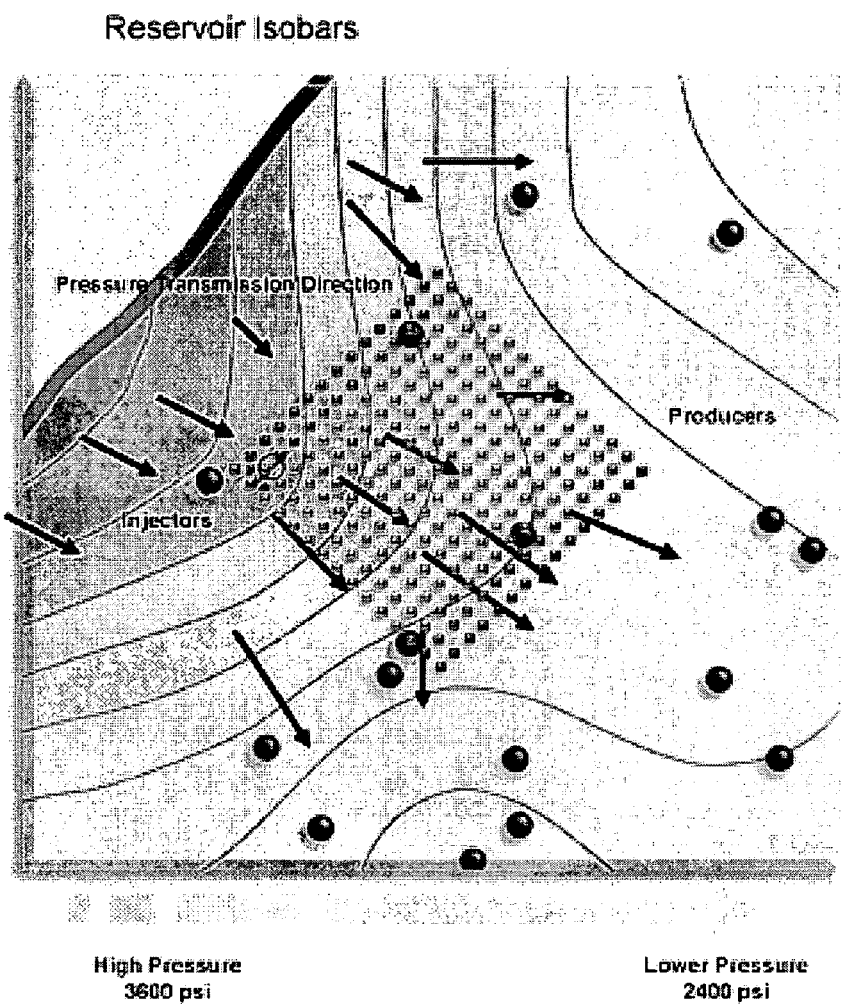
FIGS. 10A-10C schematically illustrate a reservoir map including pressure isobars, hypocenters of passive microseismic events superimposed on the reservoir map including pressure isobars, and an extrapolated fluid pathway determined from the pattern of hypocenters, respectively.
Figure 10B:
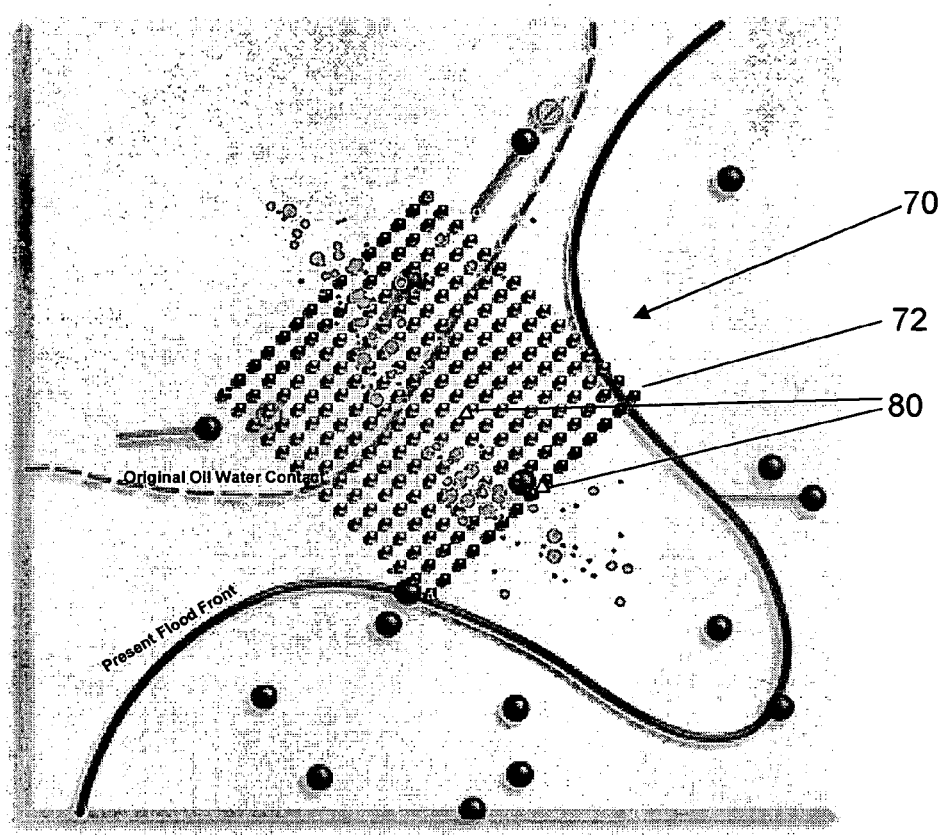
Figure 10C:
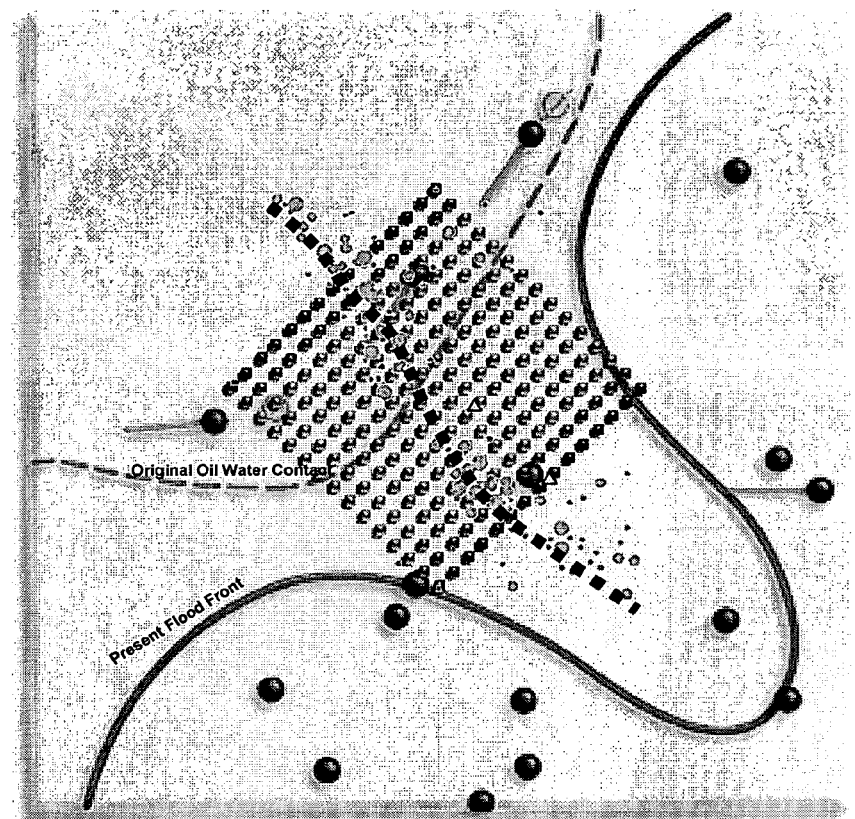

Referring now to FIGS. 10A-10C, as injected water displaces reservoir oil, the zones of weakness in the reservoir rocks, such as joints and faults, are perturbed and a local microseismic event is generated in the reservoir volume. In certain embodiments, the reservoir volume is idealized as a plurality of grid blocks, e.g., cubes of equal dimensions, which represent the reservoir matrix. These grid blocks in such a cellular model can either have a shear slippage, with resulting microseismic activity, or have no activity. When contiguous grid blocks contain microseismic events emanated from within, they can be due to a system of fractures that have been temporarily or permanently displaced by the fluid flow from water injection or oil production. The events in contiguous cells make up a trend that can be inferred as interconnected flow pathways. These grid blocks with microseismic activities would therefore be interconnected to hydraulic flow and would constitute fluid flow pathways along these preferential directions. Grid blocks having no microseismic activity are the reservoir zones with no preferential fluid flow directions or isotropic flow.

By continuously interrogating all the cells in the reservoir volume for recorded microseismic activities in the sensors deployed in the borehole and those spatially deployed on the ground surface, an estimate of the flow anisotropy and high permeability pathways can be made empirically. The network of microseismic events form a conductivity network that forms input to reservoir simulation for computing fluid flow through such network.

The microseismic emissions from the reservoir are calibrated by correlating with induced activity in the reservoir. The rates of fluid injection and production in the reservoir are varied or 'pulsed' at the well locations and their effects on detection and recording of microseismicity in the monitoring well and the surface sensors are examined. The microseismicity detected above the ambient noise threshold due to such controlled pulsing of reservoir provides a correlation with the reservoir pressure and flow rate. The processed microseismic attributes also need to be correlated with the spatial distribution of surface sensors and vertical antenna in the monitoring well.

The processing architecture for the microseismic system consists of signal processing of recorded seismograms from the surface and the bore-hole sensors and integrating the results of the total system. The surface data is summed over time windows, the recorded seismic energy in the data is migrated using a velocity model in the area of study and epicenter locations for the microseismic events and their recorded time of occurrence are corrected. These epicenters of microseismic events are related to the hypocenters of events derived from the processing of the microseismic recording in the borehole sensors. The time synchronous events for the hypocenters located at various reservoir depths for the two sensor systems (surface and well bore sensors) are matched for interpretation of shear slippage in the zones of weakness in reservoir rocks. The assumption is that this shear slippage is due to perturbation of the reservoir fluids by injection and production operations. The shear slippage is along existing zones of weakness in the reservoir rock matrix. The change in reservoir pressure from variations in injection and production rates produces stress gradient in the reservoir. The reservoir pressure is higher near the injectors and lower at the producers.

Figure 4A:
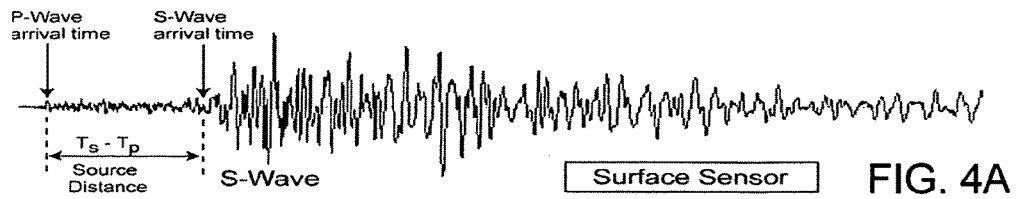
FIG. 4A is a schematic illustration of data from a surface sensor in the field.
Figure 4B:
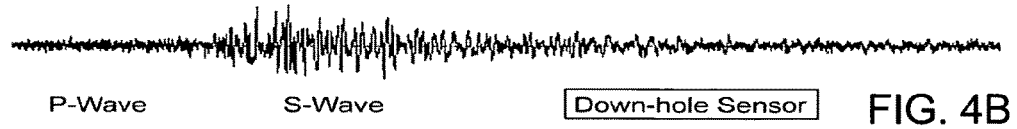
FIG. 4B is a schematic illustration of data from a downhole sensor in the field.
Figure 4C:
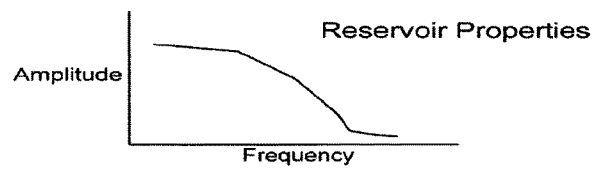
FIG. 4C is a graphic representation of data of reservoir characteristics.
Figure 4D:
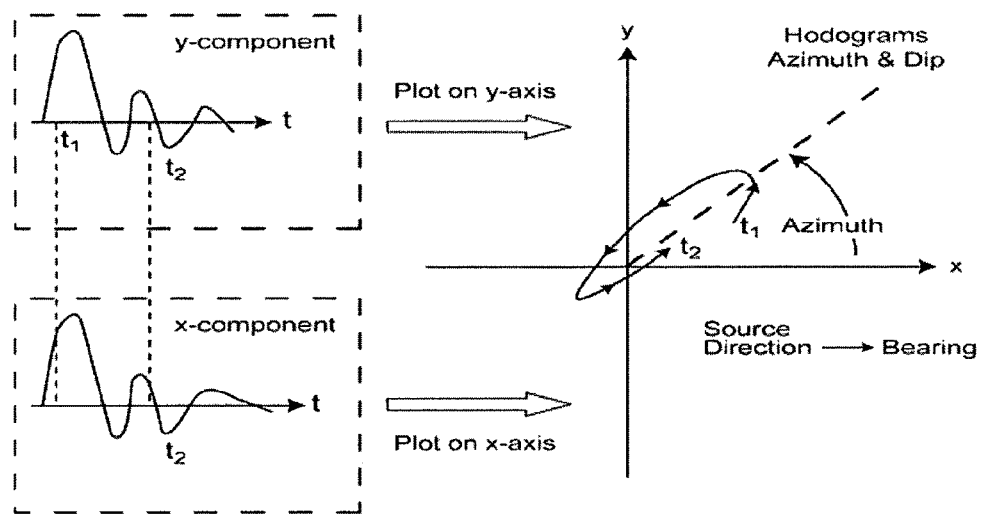
FIG. 4D is a schematic illustration of data processing of the x-components and y-components of seismic data to plot two-dimensional hodograms of the seismic data.

FIGS. 4A and 4B show the compressional, or P-waves, and shear, or S-waves, from the source measured at the surface sensors and borehole sensors, respectively. The difference between the arrival times of P- and S-waves provide the distance between the source and receiver locations. The seismic wave velocity model, from source to the sensors, for P- and S-waves, are used for resolving the source locations using a tomographic technique.

FIG. 4D shows hodograms of seismic waves, as the terminus of a moving vector for particle motion recorded in the three component sensors. The recorded data are analyzed for the hodograms to compute the azimuth and dip for the seismic waves arriving at the sensors. Hodograms computed from the recorded passive microseismic data provide the azimuth and dip for the seismic waves arriving at the sensors and are used to calculate the microseismic event source point or hypocenter locations. The direction of the microseismic source to receiver is inferred from the P-wave particle motion hodograms. The spectral frequency of the signal is used for estimation of the radius of rock failure and the polarity hodogram and relative amplitudes of the seismic signal components indicate the orientation of the elastic deformation surface.

Figure 5:
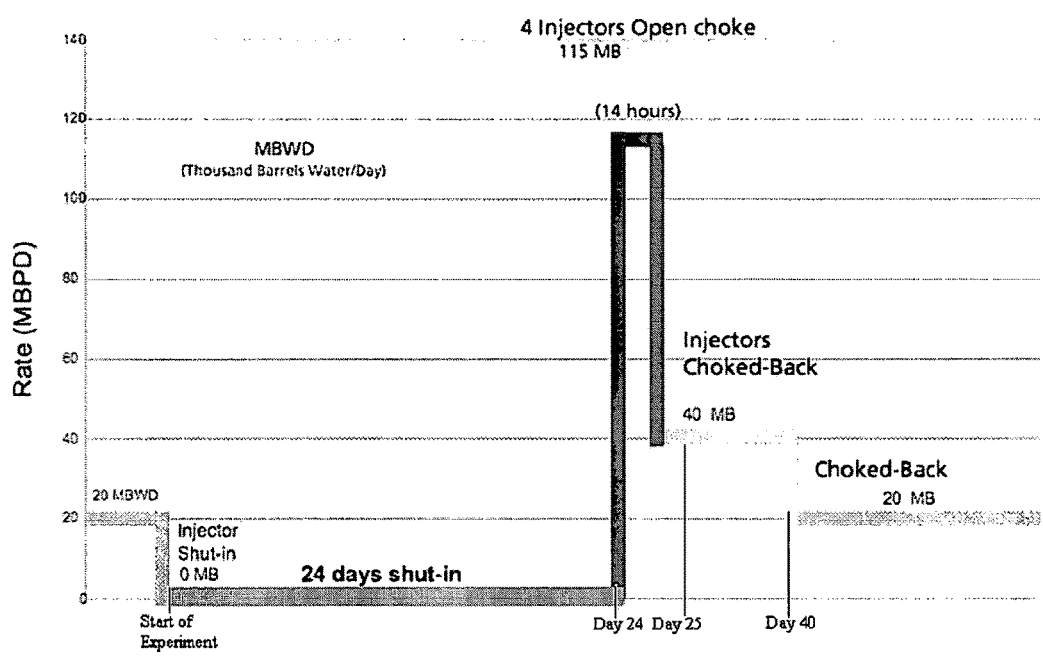
FIG. 5 is a plot of injection rates over a period of time according to a process of the present invention.

FIG. 5 is a plot of water injection over time, and FIGS. 6-9 illustrate data over the period of time corresponding to the plot of FIG. 5 in a process according to the present invention. FIGS. 10A-10C illustrate pressure isobars before water injection, hypocenters of passive microseismic events after ramped up water injection superimposed on the reservoir map including pressure isobars, and an extrapolated fluid pathway determined from the pattern of hypocenters.

Microseismic data was collected in a carbonate rock reservoir. This data was plotted as shown in FIGS. 6-9, where the shapes of larger size indicate larger magnitude events, and the shading from dark to light represent decreasing depth. The data plotted in FIGS. 6-9 was plotted using commercially available seismic analysis software. Examples of suitable software include Antelope Environment Monitoring Software commercially available from Kinemetrics Inc. of Pasadena, Calif., USA; Atlas Data Processing Software commercially available from Nanometrics Seismological Instruments Inc. of Ontario, Canada; SonoDet commercially available from the Institute for Geophysics, University of Stuttgart of Stuttgart, Germany; and Seisan Earthquake analysis software commercially available from Norwegian Seismic Array (NORSAR).

An investigation according to the method and system described herein was conducted in a Jurassic carbonate rock reservoir using an installed microseismic sensor network 70, similar to that schematically illustrated in FIG. 3, that included 225 surface sensors 72 and 33 total downhole sensors in monitoring wells 80 (9 in a shallow well and 24 in a deeper well). Each surface sensor and downhole sensor included x, y and z sensor components to determine the location and direction of shear slippage defined by the microseismograms. The network encompassed an area of 3 kilometers by 3 kilometers. The region included injection wells to the west and production wells to the east as oriented in the figures. The injection wells were located at the flanks of the anticline structure.

Figure 6:
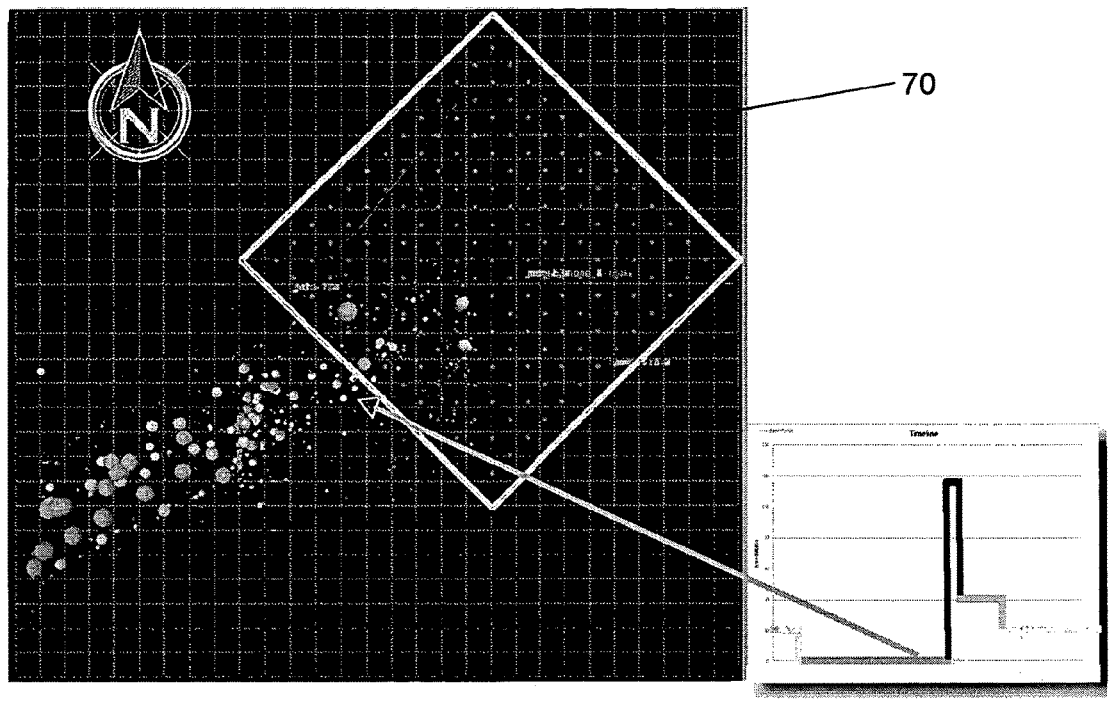
FIGS. 6-9 illustrates a mapping of sensed hypocenters during various phases of the process plotted in FIG. 5.

Introduction of sea water through the injection wells was suspended for 24 days from a normal injection rate of 20,000 barrels per day in order to establish a seismically quiet area, as illustrated in FIG. 5. During this time, the production wells to the east of the injectors were producing oil at normal rates. From passive seismic data detected by the network 70 of surface sensors 72 and borehole sensors 74, hypocenters were computed while the injectors were shut-off, i.e., corresponding to a ramped down period in the process flow shown in FIGS. 1A and 1B. These hypocenters emanating from the reservoir depth are oriented in a southwest to northeast (SW-NE) direction, as illustrated in FIG. 6. The number of events in the fluid pathway, as described further herein, was negligible. The events in the SW-NE direction, shown over a 6-hour period, are attributable to production activities in a region to the west of the area shown in FIGS. 6-9, which continued throughout the time period plotted in FIG. 5. These events were caused by the disturbance of the steady-state equilibrium due to the stoppage of water injection. Note that these events are not shown in FIGS. 7-9 due to normalization of the display by the seismic analysis software to reduce the effect of noise.

Figure 7:
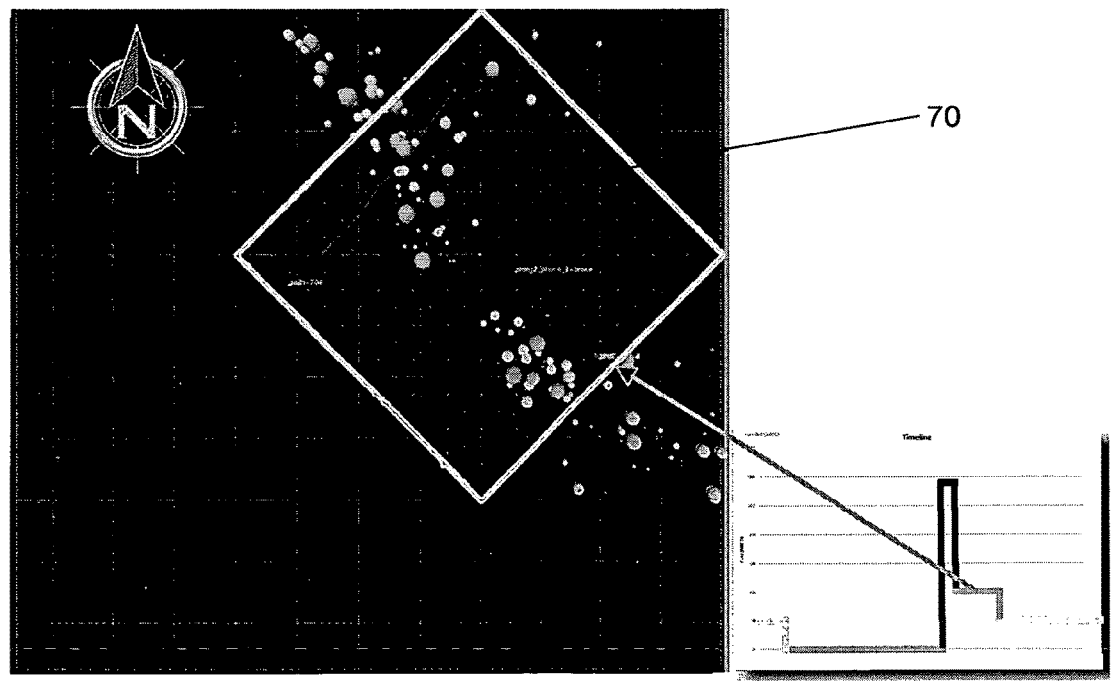
Figure 8:
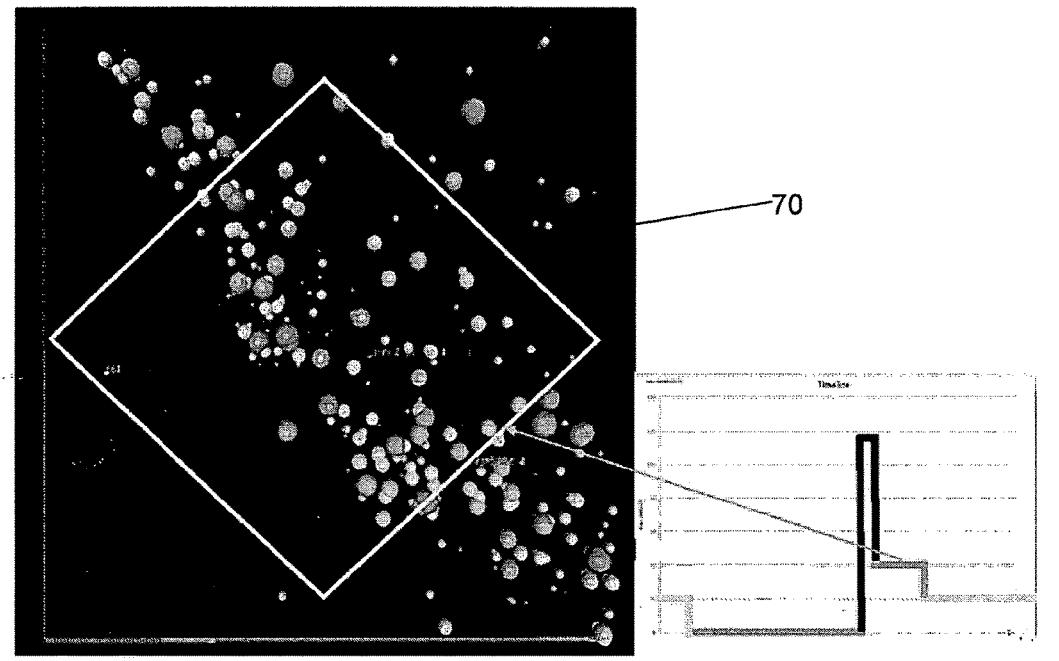

Referring again to FIG. 5, water injection shut-off was followed by high water injection rates of 115,000 barrels per day for 14 hours through the injection wells. FIG. 7 shows that the sensor network detected a large number of events, shown over a period of 6 hours commencing immediately after the period of high water injection. These events were clustered along a specific pattern through the area in a northwest to southeast (NW-SE) direction. It is clear that the microseismic events during water injection revealed a distinctly different trend from the events during injection shut-off. Since only the water phase was flowing around the water injectors, this enabled correlation of this abundant number of NW-SE microseismic events to the flow of the water phase. These events occurred along a narrow NW-SE pathway through which the water phase was flowing. As injection pulsing continued and additional water was injected at a much higher than normal rate, the number of events in the hypocenter swarm increased in intensity, generally due to the cumulative increase in water in the preferential fluid pathway. The orientation direction of the hypocenters continued to be in a NW-SE trend, as shown in FIG. 8, which represents microseismic events over a 6 hour period after 15 days of water injection at 40,000 barrels per day. This corridor appears to be located in a zone of a high permeability pathway along which injected water preferentially advanced through the reservoir.

Figure 9:
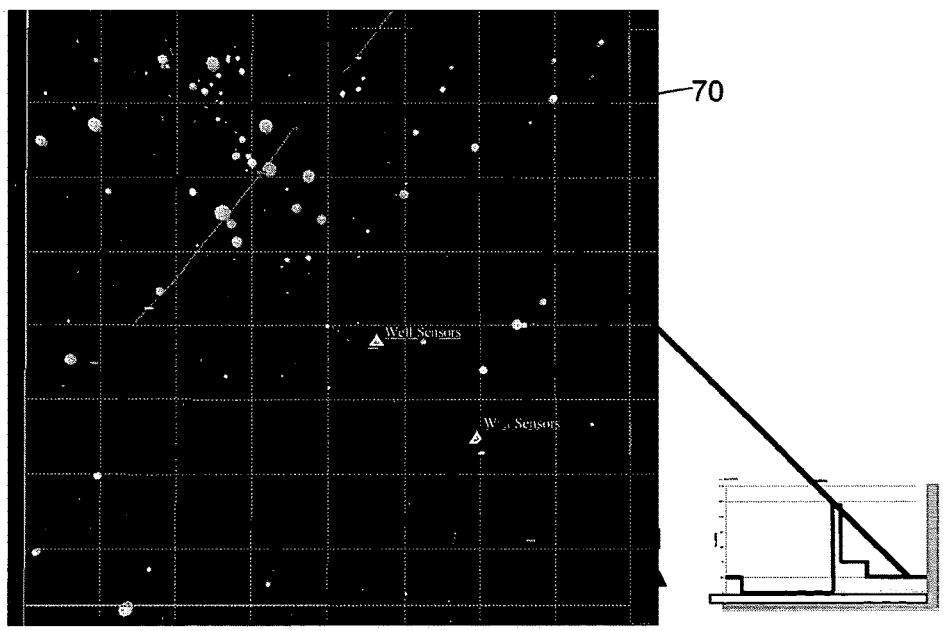

FIG. 9 shows events computed from seismograms recorded after 20 days of injection at the ambient injection and production rates. Note that there are only a few events, and the orientation is inconsistent. Closer to the injection wells they are somewhat oriented in a NW-SE trend that is consistent with the surge injection.

The relative magnitudes of these NE-SW events during the stoppage of water injection are small compared to those detected during surge injection. The steady state equilibrium is slightly disturbed by stopping injection. With a surge in injection rate in the reservoir the equilibrium condition is substantially altered. This results in a much larger density of NW-SE trending microseismic events. This is attributable to the larger mobility of the water phase relative to the oil phase in the reservoir. A narrow pathway along which water flow finds the least resistance is populated by swarms of microseismic events. This heterogeneity in the reservoir rock matrix and a zone of weakness along this NW-SE trend is responsible for the preferential pathway for injected water. In a reservoir producing oil it is important to be able to define the pathways for water advancement and to predict the "water break-through" in a producing well. Using the method and system of the present invention, this water pathways in the reservoir can be predicted. The oil in the reservoir is essentially continuous and will continue to produce from wellbore until water arrives. Water has a higher mobility in the reservoir and is thus easier to produce. Oil does not mix with water so it will not flow in the well once water hits.

FIG. 10A shows pressure isobars and direction of the pressure transmission over time, represented by arrows on the reservoir map. FIG. 10B shows the hypocenters of passive microseismic events superimposed on the reservoir map of FIG. 10A. The reservoir pressure contours are compared to the distribution of hypocenters. The left side shows higher pressures close to the injectors as expected. The arrows indicate the pressure front advancing over time. Clearly, the hypocenters appear to be parallel to the pressure trend.

The trend of microseismic events shown in FIG. 10C during injection pulsing follows the same direction as the pressure transmission in the reservoir. The events are along a narrow corridor through which movement of the pressure front is more rapid. The reservoir flood-front advances through this weak zone of reservoir rock possibly due to fluid conductive fractures.

The results described with respect to FIGS. 5-10C confirm that the method and system of the invention enables identification of the fluid phase (water or oil) flowing along a reservoir pathway. By passively recording microseismicity, determining and mapping a number of microseismic events in a first time period where the water injection rate is below that of normal steady-state oil production, and determining and mapping the number of microseismic events in a second time period during which the water injection rate is above that of normal steady-state oil production, a preferential fluid pathway can be identified and a baseline number of events per unit time can be ascertained for that fluid pathway. Thereafter, by continuously or periodically monitoring the previously identified fluid pathway(s), activity associated with water flow can be identified when the number of events over a time period approaches the baseline number of events per unit time.

In an alternative embodiment, several ramp-up water injection pulses can be performed to set the baseline for use during monitoring. For instance, a cyclic water injection operation can include injection of water at a high rate followed by a shut in period, and repeating these steps for a desired number of cycles. The number of microseismic events may determined and used as a baseline value, for instance, to compare to monitored microseismic events and to ascertain that the liquid moving along an identified preferential pathway is water if the number of monitored events approaches the number of baseline events.

Figure 11:
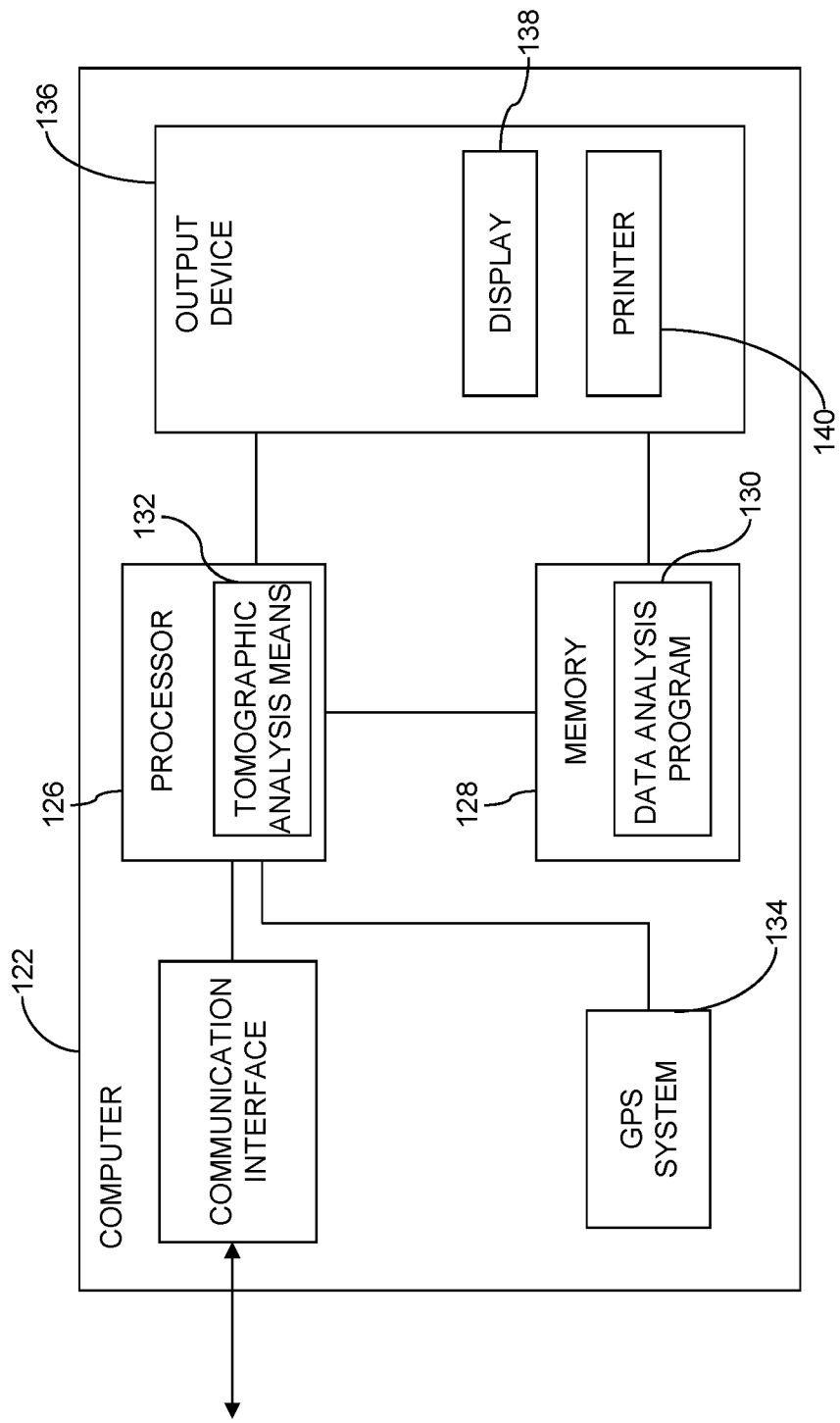
FIG. 11 is a schematic illustration of the components of a data processing computer used in the present invention.

The microseismic data is gathered for processing by a computer 122 as shown, for example, in FIG. 11, which can implement a seismic server. A communication interface 124 connects to the sensors, and the microseismic data is acquired by a processor 126 for storage in a memory 128. The processor 126 and memory 128 can be implemented by any known computing system, such as a microprocessor-based server or personal computer. A data analysis program 130 is provided in the memory 128 and executed by the processor 126 for performing the operations, steps, and features of the process flow described in FIGS. 1A and 1B, or alternatively as shown in FIGS. 1A, 1B and 2. For example, the processor 126 can include, as hardware and/or software, tomographic analysis means 132 known in the art for generating tomograms corresponding to the acquired microseismic data, and performing the comparisons of the monitored events to the baseline events. The computer 122 can include or be connected to a GPS system 134, which can incorporate or be connected to a GPS system associated with the sensors, for managing the received microseismic data according to their time of acquisition.

The computer 122 can include and/or be connected to an output device 136 which can include a display 138 and/or a printer 140 or other known output devices, such as plotters. Once the system 10 has processed the microseismic data using the data analysis program 130 and/or the tomographic analysis means 132, with such microseismic data having been received at the processor 126 via the communications interface 124, the processor 126 can generate and output a graphical mapping of the detected hypocenters 98 and determined flow pathways 102, as shown in FIGS. 6-9 and 10A-10C. The outputted mappings can be displayed to the user on the display 138 and/or can be printed on a printer 140 or plotted using a plotting device. Using the computer 122 to implement the system and method of the present invention, estimates of microseismic source or hypocenter locations can be made by picking the first arrival times of P-wave and S-wave events, or first breaks, from the recorded seismograms. Hodogram analysis, such as shown in FIG. 4D, provides the polarization direction of the P-waves and S-waves, and the velocity characteristics of the rocks obtained from other measurements in the area are used for tomographic inversion of the picked travel times to obtain the range for the source point of the respective microseismic event or the hypocenter.

While the methods and systems of the present invention are described with respect to land-based sensors and sensor networks, it will be appreciated by one of ordinary skill in the art that, with appropriate adaptations, the method of and system for determining the type of liquid moving along a flow pathway can be practiced in underwater oil-bearing reservoirs.

The present invention advantageously provides a method of and system for continuously detecting these passive microseismic events or micro-earthquakes for monitoring fluid pathways in a hydrocarbon reservoir. Anisotropic fluid flow or uneven directional flow rate is commonly associated with reservoir production and injection operations. As fluids are produced from, and injected into the reservoir, microseismic events are generated due to the flow anisotropy. Therefore, in accordance with the present invention, fluid flow anisotropy, or pathways, can be mapped, and the reservoir phase (oil or water) of fluids moving along such pathways in a reservoir volume can be identified, between and away from wells. Mapping of microseismic hypocenters within time windows provides the frequency of occurrence of microseismic emissions, i.e., the number of microseismic hypocenters per unit time. The difference in the frequency of occurrence is used for discriminating oil transport from water transport through the reservoir flow pathways. The result enhances reservoir model accuracy, reservoir management, and improved oil recovery.

The method of, and system for identifying the type of reservoir fluid moving along flow pathways using passive seismic emissions advantageously allows operators of a producing field to optimize reservoir management and improve overall oil recovery. In particular, reservoir engineers can plan appropriate development of production and/or injection wells. For instance, when it is determined by the method and system of the present invention that the type of fluid moving at a certain location along a pathway is water, placement of production and injection wells at that location can be avoided. If existing wells have already been drilled in those regions, attempts at production and/or injection operations can be suppressed. Further, when it is determined that the type of fluid moving at a certain location along a pathway is oil, reservoir engineers can plan development of production wells in the region of that pathway, or if existing production wells have already been drilled in those regions, extraction operations can be maintained or resumed. In addition, reservoir engineers can plan the locations of injection wells, generally avoiding areas where either type of fluid pathways exist. Advantageously, the information derived using the system and method of the present invention provides substantial economic benefit, in terms of the efficiency of extraction. Furthermore, by avoidance of drilling or reopening production wells in regions where the preferential fluid pathway contains water, the cost of removing water is obviated. Furthermore, in the case of saline water, suppression of extraction provides the additional benefit of reducing the exposure of equipment and pipelines to the corrosive effects of saltwater.

The method and system of the present invention have been described above and in the attached drawings; however, modifications will be apparent to those of ordinary skill in the art and the scope of protection for the invention is to be defined by the claims that follow.

The invention claimed is:

1. A method of determining whether a liquid moving in an oil-bearing reservoir rock formation is water or oil, the oil-bearing rock formation having at least one production well and at least one source of injected water, that is constant or variable, during normal oil production, the method comprising:
   providing a distributed network of sensors positioned over an area corresponding to a subterranean oil-bearing reservoir, wherein the distributed network of sensors comprises at least one sensor at the earth's surface and at least one sensor at a subterranean position;
   identifying a preferential fluid pathway;
   establishing a baseline number of passive microseismic events per a predetermined unit of baseline time;
   monitoring passive microseismic events in the preferential fluid pathway during normal oil production to sense a number of microseismic events during a predetermined unit period of monitoring time,
   comparing the sensed number of microseismic events during the predetermined unit period of monitoring time to the baseline number of passive microseismic events per the predetermined unit of baseline time; and
   determining that fluid causing the microseismic events is water if the sensed number of microseismic events during the predetermined unit period of monitoring time approaches the baseline number of passive microseismic events per the predetermined unit, and if the baseline number of passive microseismic events per the predetermined unit baseline time is measured during a time period when the water injection is greater than the rate of water injection during normal oil production.

2. The method as in claim 1, further comprising:
   determining that fluid causing the microseismic events is oil if the sensed number of microseismic events during the predetermined unit period of monitoring time approaches the baseline number of passive microseismic events per the predetermined unit, and if the baseline time is measured during a time period when the water injection is less than the rate of water injection during normal oil production.

3. The method as in claim 1, wherein
   the step of establishing a baseline includes establishing a first baseline for a time period when the rate of injection water is less than the injection rate during normal oil production, and establishing a second baseline when the rate of water injection is greater than the rate of water injection during the normal oil production;
   the step of comparing the sensed number of microseismic events includes comparing the sensed number of microseismic events during the predetermined unit period of monitoring time to the first baseline and to the second baseline;
   the step of determining that fluid causing the microseismic events is water includes determining that fluid causing the microseismic events is oil if the sensed number of microseismic events during the predetermined unit period of monitoring time is closer to the first baseline than the second baseline; and
   determining that fluid causing the microseismic events is oil includes determining that fluid causing the microseismic events is water if the sensed number of microseismic events during the predetermined unit period of monitoring time is closer to the second baseline than the first baseline.

4. The method as in claim 1, wherein
   the step of establishing a baseline further comprises:
   sensing a first number of passive microseismic events during a first predetermined period of time to determine a first ratio, the first number of passive microseismic events being sensed when the rate of injection water is less than the injection rate during normal oil production;
   mapping the first number of passive microseismic events;
   increasing the rate of water injection to exceed the normal oil production injection rate;
   sensing a second number of passive microseismic events during a second unit period of time to determine a second ratio, second unit period of time occurring while the rate of water injection is greater than the rate of water injection during the normal oil production; and
   mapping the second number of passive microseismic events;
   the step of identifying a preferential fluid pathway is based upon the mappings of the first number of passive microseismic events and the second number of passive microseismic events;
   the step of monitoring passive microseismic events in the preferential fluid pathway during normal oil production comprises sensing a third number of microseismic events during a third predetermined unit period of time to determine a third ratio,
   the step of comparing the sensed number of microseismic events comprises comparing the third ratio to the first ratio and the second ratio;
   the step of determining that fluid causing the microseismic events is oil makes such determination if the third ratio is closer to the first ratio than the second ratio; and
   the step of determining that fluid causing the microseismic events is water makes such determination if the third ratio is closer to the second ratio than the first ratio.

5. The method as in claim 1, comprising a plurality of sensors at a surface level.

6. The method as in claim 1, comprising a plurality of subterranean sensors.

7. The method as in claim 1, comprising a plurality of sensors at the earth's surface and a plurality of sensors at subterranean positions.

8. The method as in claim 1, wherein at least one of the of the plurality of subterranean sensors is at a different depth than another one of the plurality of subterranean sensors.

9. The method as in claim 1, wherein the surface sensors are cemented.

10. The method as in claim 1, wherein each time of sensing by each sensor is determined by an associated GPS receiver.

11. The method as in claim 1, further comprising establishing a baseline magnitude for passive microseismic events associated with water, and determining that fluid causing the microseismic events is water if the number of events approaches the number of events for a baseline based upon water and the magnitude of the microseismic events approaches the baseline magnitude.

12. The method as in claim 1, wherein the sensors comprise three component sensors.

13. The method as in claim 6, wherein at least one of the of the plurality of subterranean sensors is at a different depth than another one of the plurality of subterranean sensors.

14. The method as in claim 5, wherein the surface sensors are cemented.

15. The method as in claim 6, wherein the sensors comprise three component sensors.

16. The method as in claim 7, wherein at least one of the of the plurality of subterranean sensors is at a different depth than another one of the plurality of subterranean sensors.

17. The method as in claim 7, wherein the surface sensors are cemented.

18. The method as in claim 7, wherein the sensors comprise three component sensors.

* * * * *